Oct. 5, 1926.
G. DOMINGUEZ
1,602,002
TRANSMISSION BAND
Filed July 25, 1924
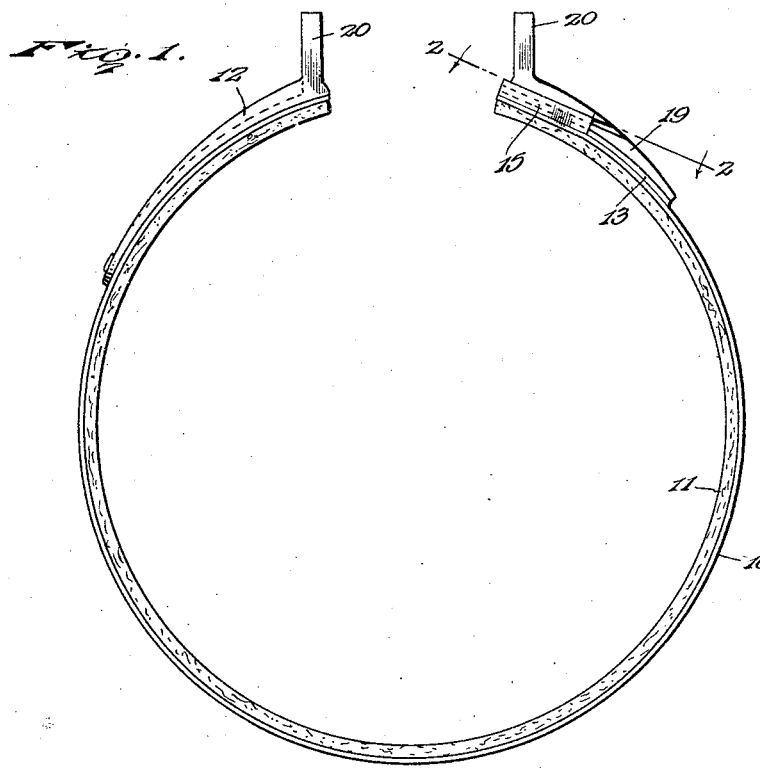
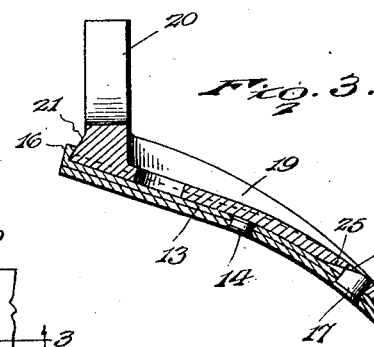
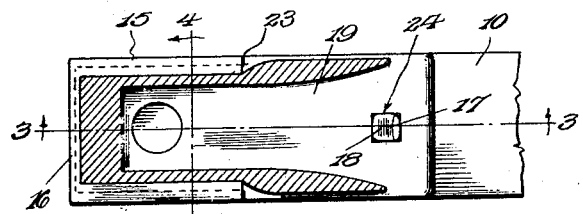
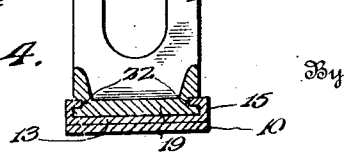
Inventor
G. Dominguez.
By
Attorney Patented Oct. 5, 1926.

1,602,002

UNITED STATES PATENT OFFICE.

GABINO DOMINGUEZ, OF TRINIDAD, COLORADO.

TRANSMISSION BAND.

Application filed July 25, 1924. Serial No. 728,220.

This invention relates to an improved transmission band especially designed for use in connection with the transmissions of Ford motor vehicles and seeks to provide a novel construction whereby the band may be removed without the necessity for displacing the transmission case cover.

The invention further seeks to provide a transmission band wherein one of the ear irons of the band may be readily detached so that the band may be removed endwise from the transmission.

And the invention still further seeks to provide a band wherein the removable ear iron will be rigidly and securely fixed to the band for withstanding thrust thereon, when the band is contracted, as well as obviating the possibility of accidental displacement of the ear iron.

Other and incidental objects will appear hereinafter.

In the drawings:

Figure 1 is a side elevation showing a transmission band embodying the present invention, Figure 2 is a sectional view on the line 2—2 of Figure 1, looking in the direction indicated by the arrows, and particularly showing the shoulders on the removable ear iron, Figure 3 is a sectional view on the line 3—3 of Figure 2, looking in the direction indicated by the arrows, and particularly showing the anchoring studs for the ear iron, and Figure 4 is a transverse sectional view on the line 4—4 of Figure 2, looking in the direction indicated by the arrows.

In carrying the invention into effect, I employ an annular-shaped flexible, resilient metal strap 10 to which is appropriately secured a lining 11 of approved character, and riveted or otherwise fixed to the strap at one end thereof is an ear iron 12. Welded to the strap at its opposite end is an overlying plate 13 which is preferably also secured to the strap by a reinforcing rivet 14, and formed on said plate is, as particularly shown in Figure 4, a pair of angle-shaped parallel side flanges 15 integrally connected at their forward ends by an end flange 16. As brought out in Figure 3, the flange 16 is undercut at its inner side and is thus formed with a downwardly inclined inner face. Extending through the strap 10 and through the rear end portion of the plate 13 is an upstanding anchoring stud 17 suitably fixed to the strap. This stud will thus cooperate with the rivet 14 for securing the plate against displacement and, as brought out in Figure 3, the stud is formed at its outer end with a beveled forward face 18.

Removably seated flat against the plate 13 is an ear iron 19. This ear iron is quite similar to the ear iron 12 and both ear irons are formed with upstanding ears 20 to accommodate the usual pedal shaft of the transmission. At its forward end the ear iron 19 is provided with a downwardly inclined beveled face 21 to seat flat against the inner beveled face of the end flange 16 of the plate 13 while at its forward end portion said ear iron is reduced in width slightly and, as shown in Figure 4, is provided at the sides thereof with longitudinal grooves 22 to slidably accommodate the flanges 15 of the plate. In thus reducing the width of the forward end portion of the ear iron, shoulders 23 are defined, as best seen in Figure 2 of the drawings, to abut the rear ends of the flanges 15. Formed in the ear iron near its rear end is a medial opening 24 accommodating the stud 17 and, as shown in Figure 2, the forward edge of said opening is cut away to define a downwardly and forwardly inclined beveled face 25 at the inner side of the ear iron. Thus, the flanges 15 and 16 will serve to rigidly connect the ear iron 19 with the plate 13 while the stud 17 will serve to anchor the ear iron against forward thrust. The shoulders 23 and flange 16 will also, of course, provide stops for the ear iron and since said flange is undercut, the flange will bear against the beveled forward end face 21 of the ear iron to cooperate with the side flanges 15 for maintaining the ear iron tightly seated against the plate 13.

To detach the ear iron 19, said ear iron is shifted rearwardly and it is now to be observed that the side flanges 15 of the plate 13 are straight. Accordingly, when the ear iron is thus shifted rearwardly, the rear end of the ear iron will be projected tangentially with respect to the curve of the strap 10 so that the beveled face 25 at the forward edge of the opening 24 will ride over the beveled face 18 of the stud 17. Thus, the ear iron may be readily withdrawn from engagement with the flanges 15 and removed, when the transmission band may be pulled endwise from around the coacting drum of the transmission and removed through the transmission cover door. To engage the ear iron with the plate 13, the forward end of said ear iron is positioned between the rear ends of the flanges 15 when, by shifting the ear iron forwardly, the ear iron will be directed by said flanges to seat against the plate while the beveled face 25 at the forward edge of the opening 24 in the ear iron will ride over the beveled face 18 of the stud 17 so that when the ear iron reaches the limit of its forward movement, the stud will be accommodated in said opening. Further, since the flanges 15 are straight while the strap 10 and plate 13 are curved, the ear iron will be caused to bind between the flanges and the plate and be wedged against accidental rearward displacement.

Having thus described the invention, what I claim is:

1. A transmission band provided at one end with a transverse and side flanges, a stud disposed in the rear of the side flanges and forwardly beveled at its outer end, and an ear iron interfitting with the said transverse and side flanges and having an opening in its rear end to receive the said stud and having the portion adjacent and forward of the opening beveled to ride upon the beveled end of the stud when sliding the ear iron into and out of engagement with the said transverse and side flanges.

2. A transmission band, a plate carried by an end portion of the band and provided at its outer end and along opposite sides with overhanging flanges, a stud in engagement with the band and plate and disposed some distance in the rear of the side flanges and having its outer end forwardly beveled, and an ear iron interfitting with the end and side flanges of the plate and having lateral shoulders engaging the rear ends of the side flanges, and having an opening in its rear end to receive the said stud and having the portion adjacent and forward of the opening beveled to ride upon the beveled end of the stud when sliding the ear iron into or out of engagement with the said end and side flanges.

In testimony whereof I affix my signature.

GABINO DOMINGUEZ. [L. S.]